US012810826B2

(12) United States Patent
Fauveau

(10) Patent No.: US 12,810,826 B2
(45) Date of Patent: Nov. 24, 2026

(54) COMPACT TRAVEL STRING INSTRUMENT

(71) Applicant: Eric Fauveau, Baton Rouge, LA (US)

(72) Inventor: Eric Fauveau, Baton Rouge, LA (US)

( * ) Notice: Subject to any disclaimer, the term of this patent is extended or adjusted under 35 U.S.C. 154(b) by 227 days.

(21) Appl. No.: 18/533,388

(22) Filed: Dec. 8, 2023

(65) Prior Publication Data

US 2025/0191555 A1 Jun. 12, 2025

(51) Int. Cl.
*G10D 3/095* (2020.01)

(52) U.S. Cl.
CPC .................................... *G10D 3/095* (2020.02)

(58) Field of Classification Search
CPC .......... G10D 3/095; G10D 1/08; G10D 1/085; G10D 3/14; G10D 3/00
See application file for complete search history.

(56) References Cited

U.S. PATENT DOCUMENTS 9,275,613 B2 * 3/2016 Borisoff .................... G10D 3/14
9,922,632 B1 * 3/2018 Craig ........................ G10D 1/00
2003/0041719 A1 * 3/2003 Fisher, IV ................ G10D 3/22 84/314 N

FOREIGN PATENT DOCUMENTS

DE 10344463 A1 * 5/2005 ............. G10D 1/108

* cited by examiner

*Primary Examiner* — Kimberly R Lockett

(57) ABSTRACT

A string instrument made of two parts, where the first part is the most compact manufacturable assembly that that can be made, including the strings and all associated parts to retain the string under their normal tuning tension and where the string instrument is suitable for ease of travel and transport. A second part which is an attachment mounted to the first part and which increases the string instrument size such that it looks and feels like the common full size string instrument model and is also playable like a full-size string instrument. In addition, the second part attachment allows for adjustment of player arm rest, and can easily be transported in its own separate travel bag, can be folded over itself, or folded underneath the first part for travel and transport.

6 Claims, 6 Drawing Sheets

COMPACT TRAVEL STRING INSTRUMENT

REFERENCE TO RELATED APPLICATIONS

The present application is related to my two design application Ser. No. 29/913,489, filed Sep. 28, 2023, titled Compact Travel String Instrument, and Ser. No. 29/913,491, filed Oct. 2, 2023, and titled String Instrument Attachment The present invention allows for ease of storing and transporting of a musical string instrument by making use of two attachable parts, while retaining all the playing characteristics of a standard size string instrument, when assembled. The novel attachment of the two parts allows for adjustability to maximize the user playing experience, in particular by providing height adjustment of the user strumming arm, with respect to the plane in which the strings are held under tension.

FIELD OF THE INVENTION

The present invention relates to musical instruments and more particularly to string instruments for use when traveling or for transportation.

Compact travel string instruments are available but there are problems associated with their implementations.

Accordingly, there is a need for an improved compact travel string instrument

THE PRIOR ART

Musical string instruments come in many different sizes and can be difficult to travel with or difficult to ship in small packages. Some instruments may include 4 strings, 6 strings, 12 strings or other number of strings. There is a need for small designs intended for travelling. The current range of offerings for compact travel string instruments usually rely on compromises that render the instruments awkward to play or also quite unattractive compare to common non-travel instruments.

One implementation of the prior art has the string tuners not placed on the head of the instrument neck, but has the tuners mounted on the main body of the instrument in order to reduce the instrument length. In this version, the strings are attached to a small block at the top of the neck which is essentially a reduced size head. One major inconvenient of the approach is that the instrument is awkward to play when the player's hand reaches the top of the neck and is placed on the first frets for playing the different chords. Another inconvenient is the space taken by the tuners on the main body require a larger size body to accommodate the tuners. This makes the whole assembly awkward and also usually requires additional rollers to wrap the strings underneath the instrument body. This approach can also make the instrument harder to tune as the strings make a 180 degree turn on the rollers.

Other design implementations have smaller bodies in order to reduce their sizes and this renders the instrument difficult to play comfortably compare to the same instrument in its normal size. These designs do not provide a comfortable or ergonomic knee rest or strumming arm support.

There are also design implementations that rely on folding the instrument for travel. The folding results in the strings tension being lost while folded. This makes the string instrument difficult to retune when unfolding because the strings to not retain the tuning until they have settled over a certain length of time under tension.

Some designs rely on a short instrument body with attachable accessories like tubes in an attempt to provide knee rest and/or strumming arm support but these still do not provide the feel and ergonomics of their equivalent full-size instruments.

There are guitar implementations describing attachable body parts or attachable neck but they are mainly intended to modify the look or configuration of the string instruments and are not specifically optimized solutions for compact travel string instruments.

DETAILED DESCRIPTION

The preferred embodiment and construction of the compact string instrument is described here for the instance of an electric guitar and is detailed as follow:

A main body with neck and head as shown in FIG. 1:

a. The compact string instrument main embodiment includes a head 10 at the top of neck 20, which is connected to the instrument main body 24. The purpose of the head is to provide space for mounting tuners 12 which are used for the tuning of each string and keep them under the needed tuning tension. It is possible to have an instrument where the strings are attached directly to a small block head at the top of the neck and without tuners on the head. In this case the tuners are installed on the main instrument body, however this is not considered a preferred embodiment. Even if this head block is small, it is still considered a head attached to the neck, for the purpose of this description.

b. In the preferred embodiment and in order the achieve the minimum possible instrument length, standard instrument tuners are used but mounted by overlapping each other without affecting tuning and playability as shown in FIG. 4. A custom assembly consisting or multiple tuners on the same plates may also be implemented in order to preserve the same tuner spacing and simplify the tuner installation.

c. The head-neck junction is typically fitted with a nut 16 at the top of fret board 22. The nut has slots in which the strings rest while under tension. Fret board 22 is sized for the specific instrument scale, which is the distance from nut 16 to bridge saddle 32. The neck is attached to instrument main body 24 which is fitted with a bridge and saddle 32 for securing the strings. The neck and main body may be one solid piece, or the neck may be removable from the main body and installed with removable bolts, as this is common in the art.

d. The preferred length of the instrument main body does not extend pass the point where the strings are attached to bridge 32, in order to keep the size of the instrument main body to its minimum length. The bridge saddle position is shown using a standard guitar string scale size for a common full-size electric guitar. The same methodology would be used for other string instruments. This allows for playing the assembled compact string instrument in the same manner as the common string instrument. The same design may be used with a shorter string scale and would allow reducing the instrument total length accordingly, however, this is not preferred as this renders the instrument harder to play. The length is further minimized by making use of a wrap-around bridge 32, which includes both the saddle and the tie points of the strings underneath the saddle. The bridge saddle provides a resting point for the instruments strings and may be a single piece that supports all the strings or may consist of individually adjustable saddles for each string, which is the preferred embodiment. Other bridge saddle combination may also be used, such as an acoustic bridge and saddle, which may be fitted with a sound pickup device under the saddle, for example.

e. For electric string instruments with metal strings, one or multiple magnetic pickups 26 are mounted onto the string instrument main body and placed underneath the strings. In order to minimize the length and width of the string instrument, a preferred method is to use one or more magnetic pickups mounted from the underside of the string instrument main body 24. FIG. 5 shows the prior art magnetic pickup mounting method and FIG. 6 shows the preferred mounting method with magnetic pickup 26 and bracket 54 held by mounting screw 56 and spring 58, from the underside of the instrument main body. The string instrument preferred embodiment has a cavity for mounting the pickup and it is closed off by a bottom cover plate. Mounting screws 56 are inserted through string instrument bottom cover plate 62 and springs are resting on the inside of the cover plate, surface 60. One advantage of this preferred mounting is that the pickup can be removed from the bottom, without requiring removal of the strings. Another advantage is that the pickup vibrates with the bottom of the main body rather than with the top of the main body where most of the string vibration is located, hence maximizing the sound pickup sensitivity. The preferred underside mount of FIG. 6 also avoids using pickup frame 50 shown in FIG. 5 on the top of instrument main body, and therefore minimizes dimensions. Mounting one or multiple pickups from the top side of the main body is also possible but not preferred.

f. As shown in FIG. 3, the bottom of the main body has a cavity with a removable cover 38 for mounting the optional electronic controls, magnetic pickup(s) and a sound output jack plug. FIG. 3 also shows the magnetic pickup mounting screw heads 36.

g. Optional electronics may include volume control 28 and frequency response 30 control as well as other optional switches for use with multiple sound pickups. In order to maintain minimal dimensions, the controls are placed very close to the strings and are recessed into the string instrument main body top, hence avoiding interference with the player strumming hand. The controls are also mounted so that their tops are located at or below the instrument strings plane, in order to avoid interference when playing the string instrument.

h. For acoustic string instruments and especially with non-metallic strings, an acoustic pickup may be used instead of magnetic pickup and installed underneath the bridge saddle in order to provide additional signal amplification and sound output.

An attachment to the main body:

a. Attachment 40 shown in FIG. 8 is an example of one that would be used with the above string instrument main body of FIG. 1 and is a removable piece with an outer shape cutout replicating or close to the one of a full-size string instrument. The attachment may be manufactured from a single piece or may also be made of two hinged parts which can fold over themselves once removed from main instrument body, for storing or transporting, as shown in FIG. 15.

b. The preferred inside cutout is such that there is an open space between the attachment and the guitar main body. This allows minimizing the weight, for the purpose of travel and transport and also provides the needed space, used for any electric signal output connection at the main guitar body output jack 34.

c. The attachment is typically mounted at two points on opposite sides of the main guitar body, such that the attachment can rotate along the axis of the two mounting points. The preferred rotation axis is parallel to the strings plane and perpendicular to the strings but other variations may be implemented. A mounting preferred embodiment uses two large head thumb captive bolts 42 that can be easily tightened or removed by hand.

d. One feature of the preferred attachment is its flexibility due to its shape and thin width between the outer and the inner cutouts. This feature and the mounting mechanism therefore allow for adjusting and tightening the attachment by securing it in the optimum position for best ergonomic support of the player's strumming arm.

e. Another feature of the preferred attachment is that its mounting allows the string instrument to be converted from a right-handed to a left-handed player instrument, by just inverting the mounting points and installing the string for right-handed or left-handed playing accordingly.

f. The attachment is fitted with two shoulder strap hooks 44. It is also shaped so that one side extends toward the guitar head. The preferred extension goes slightly beyond the center of gravity of the assembled string instrument, such that the head and neck portion is properly supported and does not tend to fall down when playing with a shoulder strap.

DESCRIPTION OF THE DRAWINGS

FIG. 1 depicts the configuration for an electric guitar but the same methodology is applicable to other string instruments.

FIG. 8 depicts the configuration for an electric guitar but the same methodology is applicable to other string instruments.

FIG. 10 depicts the configuration for an electric guitar but the same methodology is applicable to other string instruments.

Figure 1:
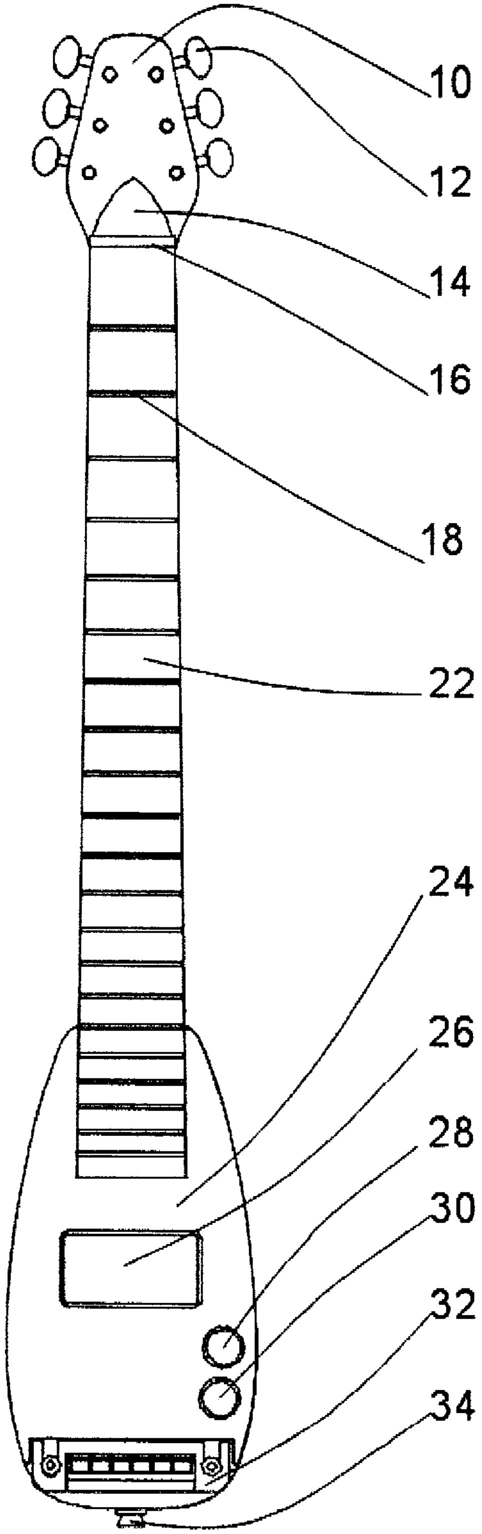
FIG. 1 is a top view of the compact travel string instrument main body embodiment with head and neck, showing minimum achievable length.
Figure 2:
FIG. 2 is a side view of the compact travel string instrument main body embodiment with head and neck, having a thin body design for ease of storage. The shape of the body shown is the preferred implementation for minimal size, but may vary.
Figure 3:
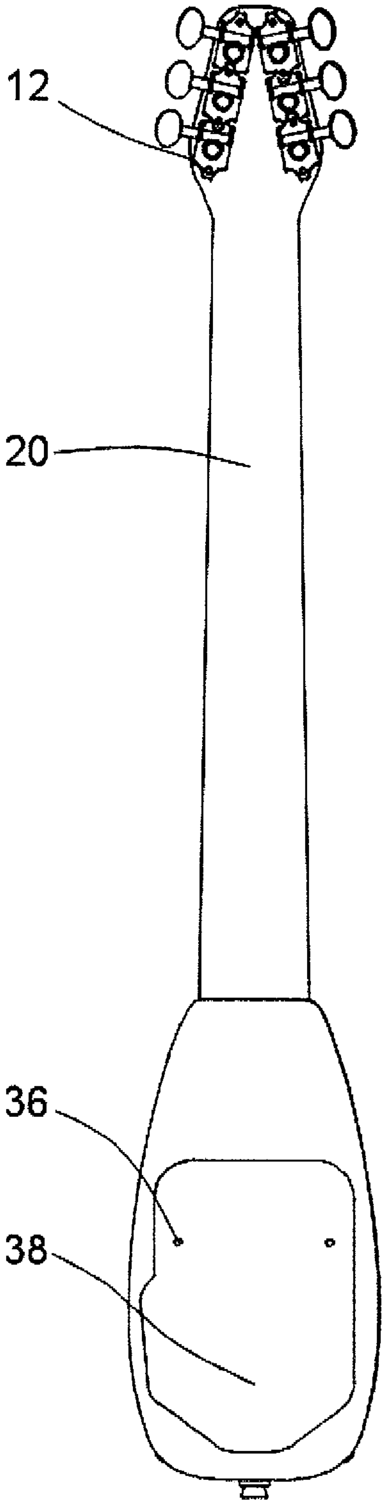
FIG. 3 is a bottom view of the compact travel string instrument main body embodiment with head and neck. The area outlined on the bottom surface represents an inside cavity with a cover opening for installation of sound pickup and associated digital signal processing electronics. The opening may or may not be needed depending of the type of string instrument and is not restricted to the shape shown.
Figure 4:
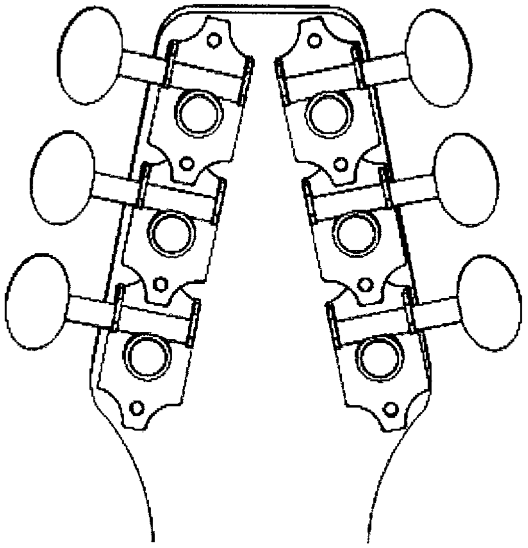
FIG. 4 is a detailed bottom view of one implementation of the neck head of the compact travel string instrument, showing details of the mounting of the overlapping string tuners. A typical setup of six strings and tuners is shown but fewer or more strings and tuners may also be used.
Figure 5:
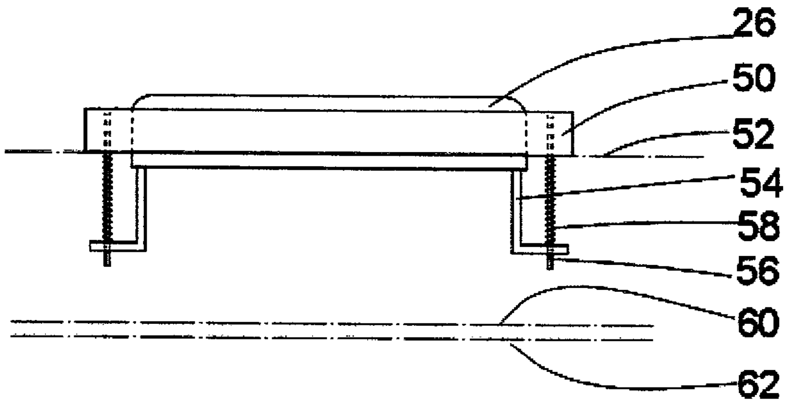
FIG. 5 is example side view of the prior art example of sound pickup mounting.
Figure 6:
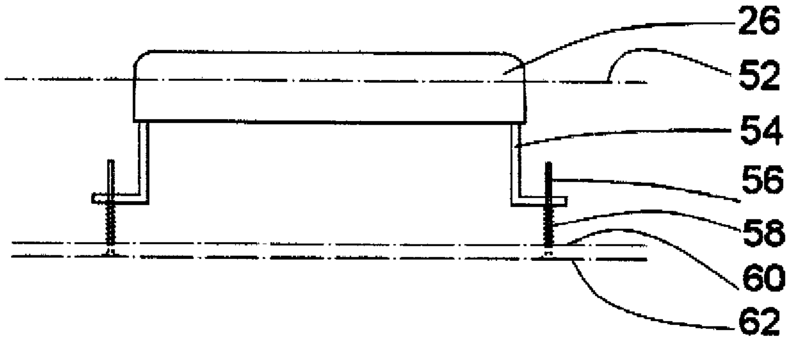
FIG. 6 is a side view of the invention sound pickup mounting.
Figure 7:
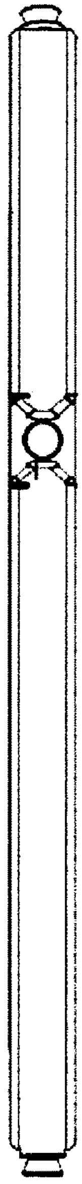
FIG. 7 is a left side view of an attachment designed to fit mechanically with the main body embodiment of FIG. 1.
Figure 8:
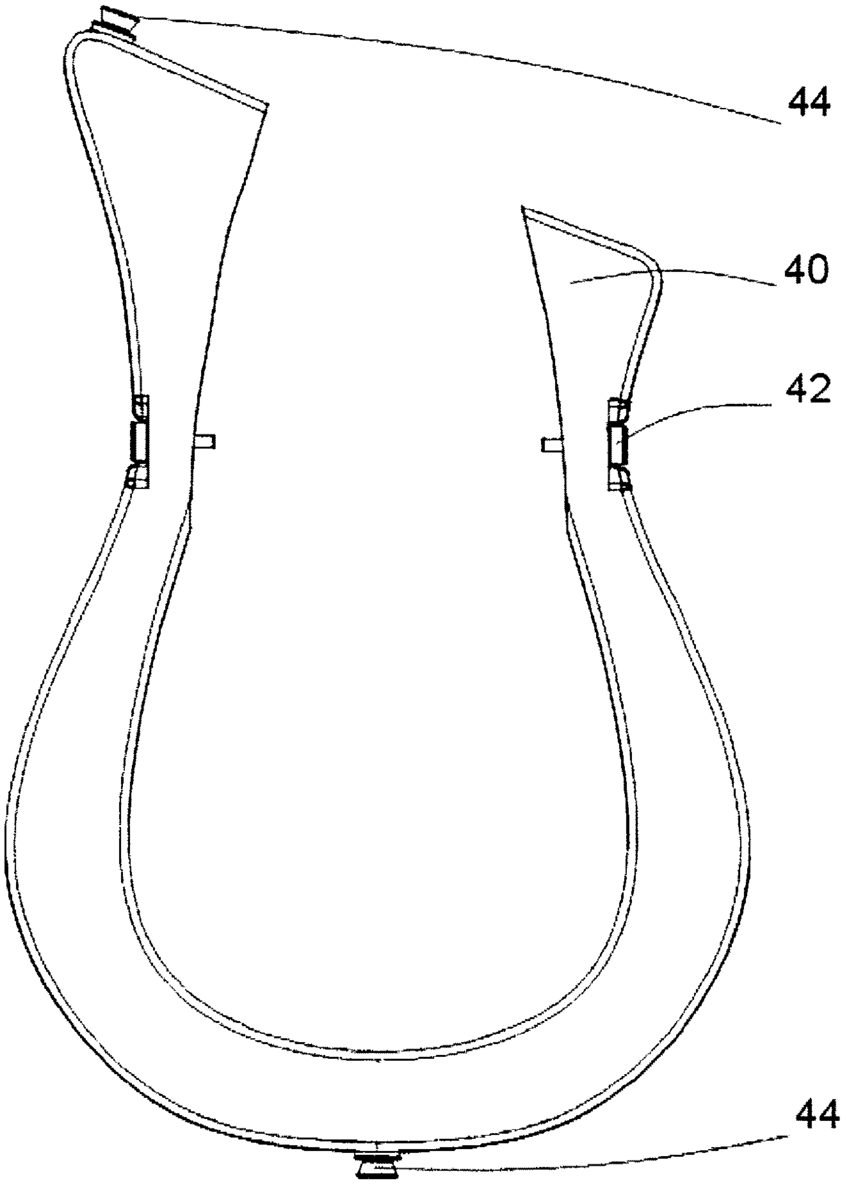
FIG. 8 is a top view of FIG. 7 attachment. The Attachment is essential in order to provide the expected playing ergonomics and the look and feel that would be available on a common string instrument.
Figure 9:
FIG. 9 is a left view of FIG. 8 attachment designed to fit mechanically with the compact travel string instrument main body embodiment of FIG. 1
Figure 10:
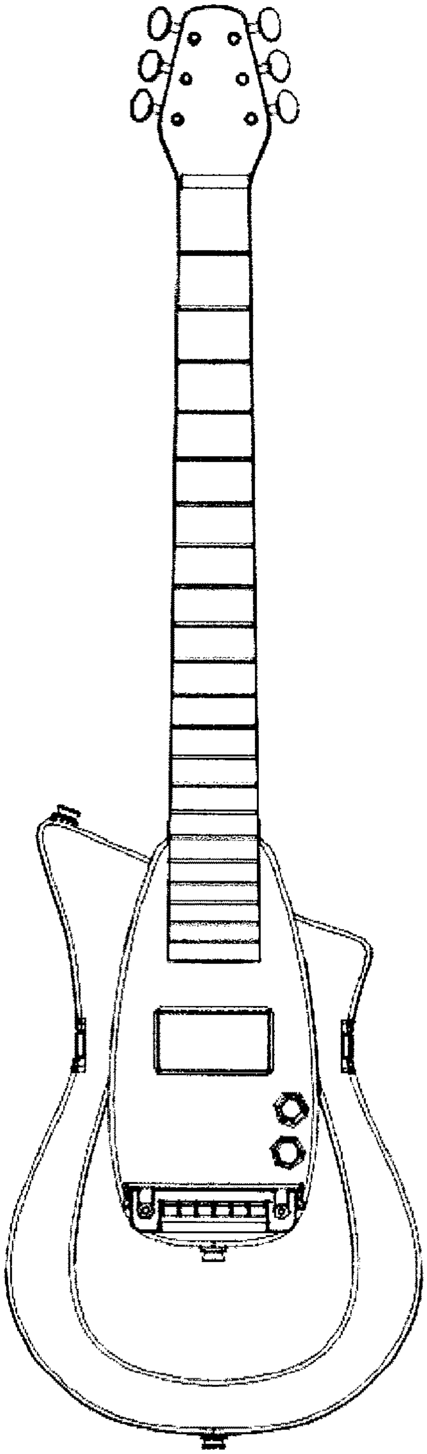
FIG. 10 is a top view of the complete compact travel string instrument with FIG. 1 embodiment and FIG. 8 attachment.
Figure 11:
FIG. 11 is a right view of the complete compact travel string instrument with FIG. 1 embodiment and FIG. 8 attachment where the attachment is parallel to the main body top surface
Figure 12:
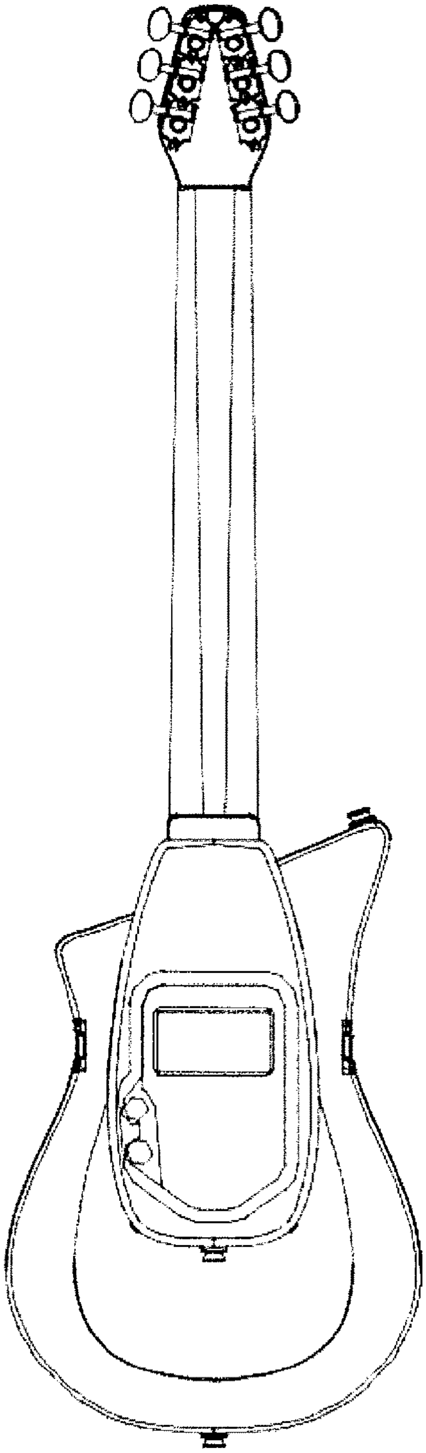
FIG. 12 is a bottom view of the complete compact travel string instrument with FIG. 1 embodiment and FIG. 8 attachment.
Figure 13:
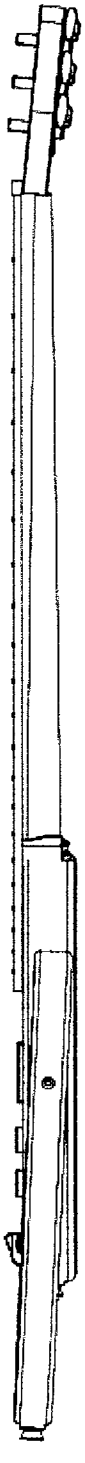
FIG. 13 is a right view of the complete compact travel string instrument with FIG. 1 embodiment and FIG. 8 attachment where the attachment is locked in place at a small angle to the main body top surface, in order to adjust for player's preference.
Figure 14:
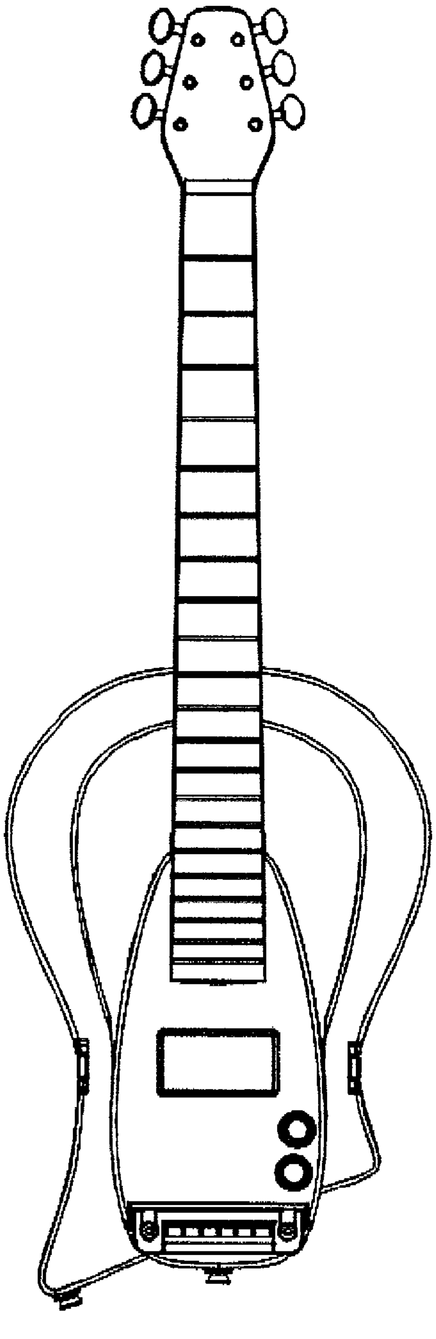
FIG. 14 is a top view of the complete compact travel string instrument where the attachment is alternatively folded over underneath the main body, for ease of storage and transport.
Figure 15:
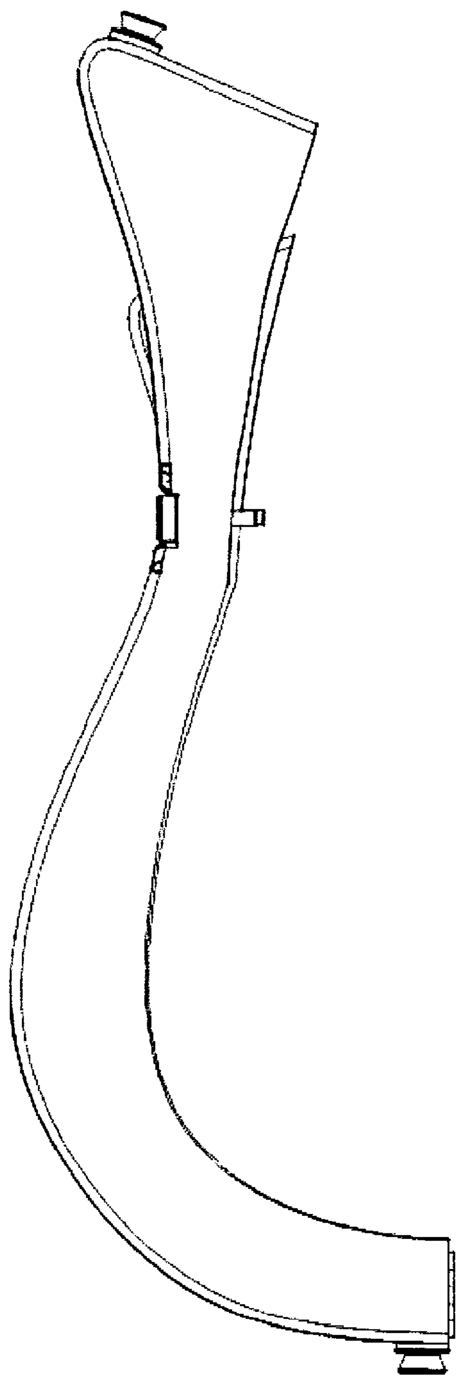
FIG. 15 is a top view of an attachment having a built-in hinge to allow for folding over itself and facilitate storage and transport.

The invention claimed is:

1. A string instrument comprising:

a head and a plurality of instrument strings wherein a end of said plurality of instrument strings is attached to said head;

a string instrument neck fixedly attached to said head;

one main body attached to said neck, and a second end of said plurality of instrument strings attached to said main body;

a bridge and at least one saddle on said main body with said plurality of instruments strings resting under tension over said bridge and at least one saddle;

one first attachment mechanism releasably attaching one side of a single attachment releasably attached to opposite sides of main body to one side of said main body and one second attachment mechanism releasably attaching a second side of said single attachment releasably attached to opposite sides of main body to a second side of said main body.

2. The string instrument of claim 1, wherein said first and said second attachment mechanism allows said single attachment releasably attached to opposite sides of main body to rotate and lock in place with respect to said main body.

3. The string instrument of claim 2, wherein an axis of rotation of said single attachment releasably attached to opposite sides of main body with respect to said main body is parallel to a plane of said plurality of strings.

4. The string instrument of claim 1, wherein said single attachment releasably attached to opposite sides of main body, when attached to said main body, creates an open space between said main body and said single attachment releasably attached to opposite sides of main body, sufficient to enable an optional electrical connection to said main body.

5. The string instrument of claim 1;

at least one control knob attached to main body, wherein an axis of rotation of said control knob is perpendicular to a plane defined by said plurality of instruments strings and said one control knob is recessed into said main body and below said plane defined by said plurality of instrument strings and said at least one control knob center does not extend past the width of the bridge.

6. The string instrument of claim 1, wherein said single attachment releasably attached to opposite sides of main body comprises two parts hingedly connected.

* * * * *